United States Patent
Nagasue et al.

(10) Patent No.: US 6,506,244 B1
(45) Date of Patent: Jan. 14, 2003

(54) STABLE POLYMORPHIC COPPER-FREE PHTHALOCYANINE PIGMENT

(75) Inventors: Hitoshi Nagasue, Nishinomiya (JP); Yves Grandidier, Rosenau (FR); Keisuke Hirano, Takarazuka (JP)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/619,160

(22) Filed: Jul. 19, 2000

(30) Foreign Application Priority Data

Aug. 3, 1999 (EP) ............................. 99810693

(51) Int. Cl.$^7$ .................. C09B 67/02; C09B 67/50; G03G 5/06
(52) U.S. Cl. ................. 106/412; 106/410; 106/411; 430/105; 430/108; 430/137; 540/139; 540/140; 540/141
(58) Field of Search ................. 106/412, 410, 106/411; 430/105, 108, 137; 540/139, 140, 141

(56) References Cited

U.S. PATENT DOCUMENTS

| | | | |
|---|---|---|---|
| 2,556,727 A | 6/1951 | Lane et al. ............. | 260/314.5 |
| 2,556,728 A | 6/1951 | Graham ................ | 260/314.5 |
| 2,982,666 A | 5/1961 | Chun et al. ............ | 106/308 |
| 3,051,721 A | 8/1962 | Pfeiffer ................ | 260/314.5 |
| 3,150,150 A | 9/1964 | Brand .................. | 260/314.5 |
| 3,160,635 A | 12/1964 | Knudsen et al. ......... | 260/314.5 |
| 3,357,989 A | 12/1967 | Byrne et al. ........... | 260/314.5 |
| RE27,117 E | 4/1971 | Byrne et al. ........... | 260/314.5 |
| 3,763,182 A | 10/1973 | Horiguchi et al. ....... | 260/314.5 |
| 3,903,107 A | 9/1975 | Griffiths et al. ....... | 260/314.5 |
| 3,936,315 A | 2/1976 | Ferrill et al. ......... | 106/309 |
| 4,894,308 A | 1/1990 | Mahabadi et al. ........ | 430/137 |
| 5,055,368 A | 10/1991 | Nguyen et al. .......... | 430/78 |
| 5,238,764 A | 8/1993 | Molaire et al. ......... | 430/58 |

FOREIGN PATENT DOCUMENTS

| | | |
|---|---|---|
| EP | 0 780 446 | 6/1997 |
| JP | 01/247464 | 10/1989 |
| JP | 07/286107 | 10/1995 |
| JP | 11/84731 | 3/1999 |

OTHER PUBLICATIONS

Journal of Crystal Growth, vol. 71, (1985) No month pp. 629–638 F. Iwatsu.
Chemistry Letters, The Chemical Society of Japan (1983), No month pp. 313–316 "Synthesis of Metallophthalocyanines from phthalonitrile with strong organic bases" H. Tomoda et al.
Chemical Abstract No. 84–259812/42 of JP 59/157649 (Feb. 1983).
Derw. Abst. 1990:414750 DN # 113:14750 of JP 01/247464 & Patent abstracts of Japan No. 01/247,464 (Oct. 1989).
J. Phys. Chem. vol. 72/7, T. Kobayashi et al. pp. 2446–2456 (1968) No month.
Chemical Abst. 93–354236/45 of JP 05/257322 (Mar. 1992).
Dewr. Abst. 1990:88270 DN # 112:88270 of JP 01/200270 (Aug. 1989).
Chemical Abst. 1990–011675 [02] of JP 01292066 (Nov. 1989).
Chemical Abst. 1985–065328 [11] of JP 60/020969 (Feb. 1985).
J. of Imaging Science vol. 29/3, pp. 116–21, R.O. Loutfy et al. (1985) No month.
Progr. In Org.. Coatings vol. 2, pp. 131–57 (1973) No month N. Uyeda.
Afinidad XLIV, vol. 407 (1–2), pp. 45–48 L. Ruiz–Ramirez et al. (1986) No month.

*Primary Examiner*—Anthony J. Green
(74) *Attorney, Agent, or Firm*—David R. Crichton

(57) ABSTRACT

The invention relates to a new polymorphic pigmentary form of phthalocyanines, the preparation therof by salt-milling a phthalocyanine crude in the presence of a water-soluble neutral organic liquid, and some uses thereof. These phthalocyanines are stable β-like mixed-phase (the α phase being totally absent) and have excellent pigmentary properties, which makes them suitable for example as pigments for electrophotographic toners.

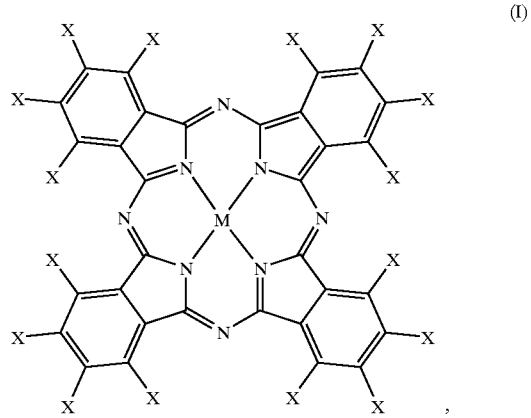

wherein M is two hydrogens or monovalent metals, a bivalent metal, or a bivalent oxometal, hydroxymetal or halogenometal moiety, with the proviso that the metal is not copper, and each X independently from all others is hydrogen or halogen.

18 Claims, 1 Drawing Sheet

STABLE POLYMORPHIC COPPER-FREE PHTHALOCYANINE PIGMENT

The invention relates to a new polymorphic pigmentary form of phthalocyanines, the preparation therof by salt-milling a phthalocyanine crude in the presence of a water-soluble neutral organic liquid, and some uses thereof.

Phthalocyanines are well-known as pigments useful for many purposes. Their properties depend very much on the metallisation, the substitution as well as the crystal modification. Usual phthalocyanine pigments for colouring purposes are non-metallized, cobalt and very especially copper phthalocyanine and halogenated derivatives thereof. There are however also some special applications where other phthalocyanines are used in small quantities, such as platinum or palladium phthalocyanine compounds as solid recording layers in optical recording media and magnesium, aluminum, titanyl, vanadyl or zinc phthalocyanine compounds as photoreceptors or charge generators in electrophotography or as magnetic recording media.

Copper phthalocyanines have been studied intensively as pigments, because their properties appeared to be absolutely unique. In fact, it is not possible to extrapolate the chemical and physicochemical behaviour, and in particular the crystal phase stability of copper phthalo-cyanines, to other phthalocyanines. For example, a copper phthalocyanine is extremely stable, while the α crystal phases of magnesium, chloroaluminium, chloroindium, vanadyl and zinc phthalocyanines, are transformed into more stable crystal modifications through the influence of mechanical forces, heat and solvents, thus increasing the absorption in the near infrared but impairing the coloristic properties (Journal of Imaging Science 29/3, 116–121, 1985).

JP-A-59/157649 discloses grinding a phthalocyanine pigment with a monomer which does not cause crystal dislocation, U.S. Pat. No. 5,055,368 salt-milling titanyl fluorophthalocyanines stepwise in the absence of solvents to a poorly crystalline form, and U.S. Pat. No. 5,238,764 contacting salt-milled titanyl fluorophthalocyanine pigments with a low polar solvent to preserve its photosensitivity. However, such procedures can only be used in few particular cases.

JP-A-01/247464, JP-A-05/257322 and JP-A-07/286107 disclose zinc phthalocyanine derivatives, those of JP-A-01/247464 having the characteristic X-ray diffraction peaks of the ε crystal modification of copper phthalocyanine. However, these derivatives have impaired pigmentary properties due to their increased solubility.

JP-A-11/84731 discloses salt-milling copper phthalocyanine in the presence of a substituted copper phthalocyanine dispersant. This product is used in a toner.

EP-0 780 446 discloses salt-kneading phthalocyanines in the presence of liquid carboxylic acids. However, this process is complicated as the acid has to be extracted with an alkali for its separation from the pigment. An expensive, closed equipment has moreover to be used due to the acids' unpleasant smell.

Example 57 of U.S. Pat. No. 3,763,182 discloses the preparation of bluish green zinc phthalocyanine from phthalodinitrile, zinc sulfate, ammonium sulfate and sodium peroxide in polyethylene glycol at low temperature.

U.S. Pat. No. 3,903,107 discloses a process for the preparation of phthalocyanine X polymorphs, which according to U.S. Pat. No. RE-27,117 is characterized by two strong peaks at Bragg angles (2θ) of 7.5 and 9.1 (in the case of metal-free phthalocyanine).

It has been surprisingly found, that phthalocyanine pigments of excellent coloristic properties, fastness and stability against flocculation, solvents and chemicals are simply obtained from crude, not chemically modified phthalocyanines which are metal-free or derived from metals others than copper, through kneading in the presence of crystalline inorganic salts in a non-aromatic, water-soluble polar solvent.

The invention relates to a process for the preparation of a pigment through kneading of a crude phthalocyanine compound with a water-soluble crystalline inorganic salt in the presence of an organic liquid, then adding water, filtrating and washing to separate said pigment from said salt, then drying said pigment, characterized in that said phthalocyanine compound is a compound or a mixture of compounds of formula

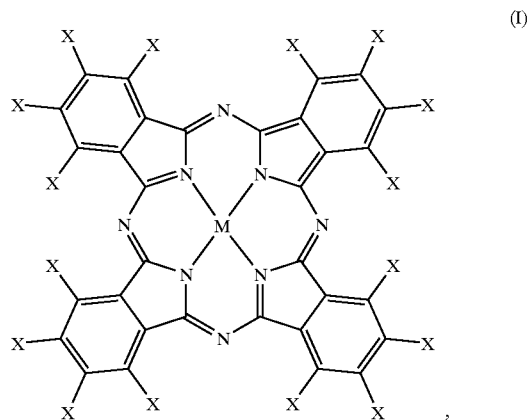

(I)

wherein M is two hydrogens or monovalent metals, a bivalent metal, or a bivalent oxometal, hydroxymetal or halogenometal moiety, with the proviso that the metal is not copper, and each X independently from all others is hydrogen or halogen; and said organic liquid is water-soluble and has at least one oxy or oxo group in its molecule.

Halogen is for example bromine, chlorine or fluorine, particularly chlorine. Preferably, the number of X which are halogen is 0, 8 or 16, most preferably 0, whereby the remaining X are hydrogen. Compounds of formula (I) are preferably of symmetry $C_{4V}$ or higher, determined in formula (I) without taking account of the bonds.

Suitable metals may for example be chosen from those of groups 1 to 10 and 12 to 14 of the periodic system (corresponding to the 1997 IUPAC nomenclature). Metals of the transition groups 2 to 6 and 12 to 14 are preferred because they are more inert and do not lead to coloured compounds in the presence of compounds which are often purposely also present in the final application medium, such as for example sulfur containing compounds. Magnesium, aluminum, titanium, vanadium, zirconium and zinc are most preferred for economic and environmental reasons.

Divalent metals are, for example, Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II) or Pb(II). Divalent oxometals are, for example, V(IV)O, Mn(IV)O, Zr(IV)O or Ti(IV)O. Divalent halogenometals are, for example, Fe(III)Cl, In(III)Cl or Ce(III)Cl. Divalent hydroxymetals are, for example, Al(III)OH, Cr(III)OH, Bi(III)OH or Zr(IV)(OH)$_2$.

The application of course also relates to the pigments obtained by above-mentioned method.

The crystalline inorganic salt should be poorly soluble in the organic liquid, generally ≦100 mg/l at 20° C., preferably ≦10 mg/l at 20° C., most preferred practically insoluble at 20° C. It should however be highly soluble in water, preferably at least 10 g/100 ml. Suitable particle sizes have a maximum of the particle size distribution by weight from 1 µm to 1 mm, preferably from 5 to 200 µm, most preferred from 10 to 50 µm.

The crystalline inorganic should also be highly soluble in water, preferably at least 10 g/100 ml. Preferred crystalline inorganic salts are aluminium sulfate, sodium sulfate, calcium chloride, potassium chloride or sodium chloride. Preferred organic liquid are alcohols, ethers, ketones, esters, amides, sulfoxides, sulfones and mixtures thereof.

The organic liquid may for example be an alcohol, ether, ketone, ester, amide, sulfoxide or sulfone, such as methanol, ethanol and isomeric propyl, butyl and pentyl alcohols, ethylene glycol, propylene glycol, butylene glycol, glycerine, diethylene glycol, polyethylene glycol and polypropylene glycol or the monomethyl, monoethyl, dimethyl or diethyl ethers thereof, diacetone alcohol, ethyl methyl ketone, ethyl butyl ketone, cyclohexanone, butyl acetate, triacetin, ethylene glycol diacetate, ethylene carbonate, dimethylformamide, dimethyl-acetamide, N-methyl pyrrolidone, dimethyl sulfoxide and sulfolane. They may of course be more than one oxy and/or oxo groups in the molecule.

It is most preferred to use neutral compounds, the $pK_a$ and $pK_b$ of which are from 5.5 to 8.5, in particular from 6 to 8, especially around 7.

The ratio of organic liquid to crystalline inorganic salt is preferably from 1 ml: 6 g to 3 ml: 7 g; the ratio of organic liquid to the total weight of crystalline inorganic salt and compound of formula (I) is preferably form 1 ml: 2,5 g to 1 ml: 7,5 g. The weight ration of compound of formula (I) to crystalline inorganic salt is preferably from 1:4 to 1:12.

Kneading is suitably effected at a temperature of from just above the melting point to just below the boiling point of the organic liquid, for a period of from about ½ hour to about 72 hours. The temperature is conveniently from −20° C. to 150° C., preferably from 0 to 100° C., more preferably from 20 to 60° C. The kneading period is preferably from 1 to 10 hours.

The specific surface area of the resulting pigment is generally from 30 to 200 m$^2$/g, preferably from 80 to 150 m$^2$/g, particularly preferred from 90 to 120 m$^2$/g.

The obtained pigments have a mixed crystalline phase mainly based on the β crystalline phase, but with additional signals corresponding to other crystal phases while different from the α crystalline phase. The intensity of some β crystalline phase signals is also disturbed, likely due to interactions between the crystal phases, the nature of which has not been elucidated, but which surprisingly have beneficial properties especially for the use as pigments. The position of the signals corresponding to other crystal phases may be slighltly shifted (about ±0.3 2θ), as compared with their position is their pure state.

The kneading process is most preferably run under such temperature and time conditions, that, for the resulting salt-free pigment, the total height of the signals corresponding to the β crystalline phase is from 50 to 95% and the total height of the signals corresponding to the α crystalline phase is from 0 to 5%, both based on the total height of all signals on the X-ray diffraction spectrum in the range of Bragg angles (2θ) from 5 to 30 (Cu $K_\alpha$), corresponding to interplanar spacings from 17.66 to 2.98 Å.

In a preferred embodiment, the instant pigment has both the characteristics of the β and the θ crystalline phases. The θ crystalline phase as reported in Progress in Organic Coatings 2, 131–157 (1973/74) is characterized by 2 strong signals at Bragg angles (2θ) between 5 and 10, at values lower than the corresponding signals of the β crystalline phase.

Thus, the application also relates to a pigment of formula (I), characterized in that the strongest 12 signals on its: X-ray diffraction spectrum correspond within ±0.3 2θ to the signals of either the β crystal phase or the θ crystal phase. This is preferably the case for the strongest 8 signals.

The instant new products have particularly interesting coloristic properties combined with excellent fastness, and can be used for multiple purposes, in particular for the manufacture of liquid or preferably solid colour toners. For use in a toner, the instant pigment is preferably washed salt-free until its conductivity reaches ≦40 mS, and micronized by conventional techniques to a particle size of from 0.05 to 0.2 µm.

The application hence also relates to toners comprising the instant pigments, a chief advantage of which being that they can be prepared by known simple methods, without having to use additives such as crystal directing, dispersing or stabilizing modified phthalocyanine compounds, and without having to avoid the influence of certain solvents and/or heat. Hence, any known preparation method for toners can be used in combination with the instant pigments, for example extrusion or in particular polymerisation techniques.

The instant toners have an excellent compatibility with present electrophotographic devices as well as excellent tinctorial strength, transparency, hue, chroma and light stability. The instant toners generally comprise from 1 to 70 weight % of the instant pigment, based on the total weight of the pigmented toner, and a polymeric resin. The toners may also additionally comprise other colourants to match the desired hue, as well as usual additives and other known functional compounds depending on the intended use. In particular, they preferably also comprise a charge controlling agent (CCA).

Non-limitative examples of suitable polymeric resins include polyimides, epoxies, polyolefins, polyurethanes, vinylics and polymeric esterification products of a dicarboxylic acid and a diol comprising a diphenol. Vinylics are for example homopolymers or copolymers of two or more monomers including styrene, p-chloro-styrene, vinyl naphthalene, unsaturated mono-olefins, methacrylate, methyl methacrylate, butylacrylates and other acrylates, vinyl ethers, vinyl ketones vinylidene halides, N-vinyl-pyrrolidones and styrene butadiene copolymers. Particulary preferred are poly-n-butylmethacrylates, copolymers of styrene and butadiene or of styrene and n-butylacrylates.

Many CCA are well-known in the field. They are for example quaternary ammonium compounds, such as alkylpyridinium compounds, including cetyl pyridinium halides and cetyl pyridinium tetrafluoroborates, organic sulfonates and sulfonate compounds.

The toner generally contains 50–99% by weight of polymeric resin and 1–50% by weight of pigment, preferably 65–98% by weight of polymeric resin and 2–35% by weight of pigment and most preferably 80–97% by weight of polymeric resin and 3–20% by weight of pigment, based on its total weight.

When the toner also comprises a CCA, it generally contains 30–99% by weight of polymeric resin, 0.5–50% by weight of pigment and 0.5–20% by weight of charge control agent, preferably 45–98% by weight of polymeric resin, 1–35% by weight of pigment and 1–20% by weight of charge control agent, and most preferably 70–95% by weight of polymeric resin, 3–20% by weight of pigment and 1–20% by weight of charge control agent, based on its total weight.

The most preferred preparation method for toners is emulsion polymerisation of a suitable unsaturated monomer in the presence of the dispersed pigment, for example but in no way limited to the processes described in U.S. Pat. No. 4,894,308, JP-A-011200270, JP-A-07/292010 and JP-A-08/305084. Very surprisingly, the instant pigments are easily dispersed and have an enhanced dispersion stability in media used for emulsion polymerisation, as compared with known phthalocyanine pigments. The viscosity of the dispersion is low. As a rule of thumb, salt-kneaded pigments are however expected to require higher dispersion energy and to reagglomerate more quickly. The instant pigments are also more homogeneously distributed within the polymer toner particles, and the colour strength of the toner is higher for a given amount of pigment.

The instant pigments may also be used in a manner known per se for the previously known phthalocyanine pigments, for examples for pigmenting polymers or waxes in the mass, also in the form of masterbatches, as magnetic toners, optical recording media, photoreceptors or charge generators, as well as for manufacturing liquid or solid coating compositions, electroluminescent materials and inks, such as inks for inkjet.

The phthalocyanine crude useful as a starting material for the instant salt kneading process can be prepared according to any of the known methods, for example by the urea process, the dinitrile process or the isoindoline process, which are well-known in the field and disclosed for example in GB-1,422,834. It is preferred to use a crude phthalocyanine which is obtained from a reaction in a polyhydric alcohol.

In a particularly preferred embodiment of the instant kneading process, a crude is used, at least 50 weight % of which is a mixture of a β crystal phase and crystal phases less stable than the β crystal phase in the organic liquid used in the kneading process.

Figure 1:
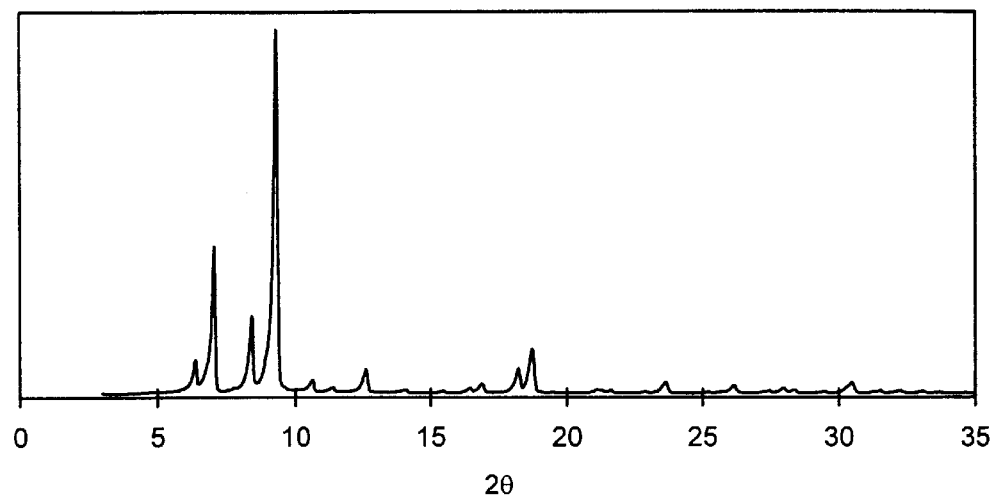
FIG. 1 shows the X-ray diffraction spectrum of the crude of example 1.
Figure 2:
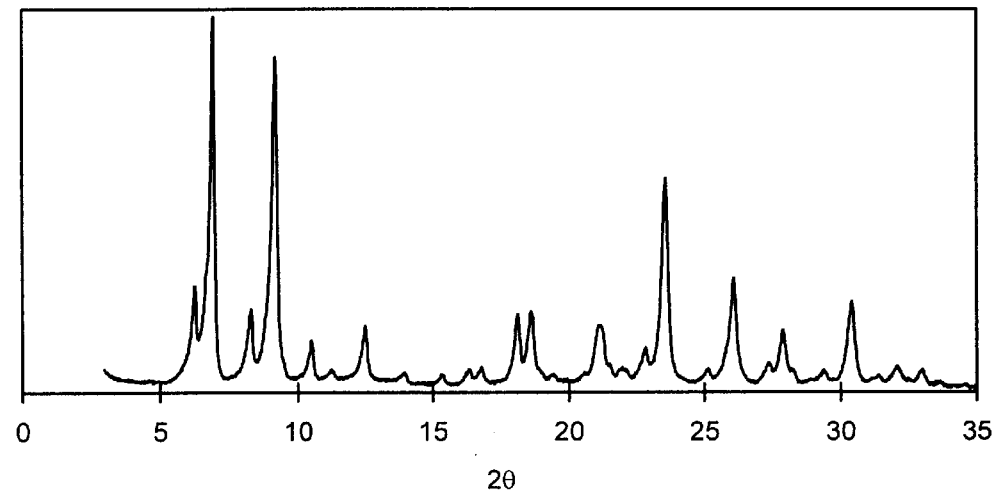
FIG. 2 shows the X-ray diffraction spectrum of the pigment of example 2.
Figure 3:
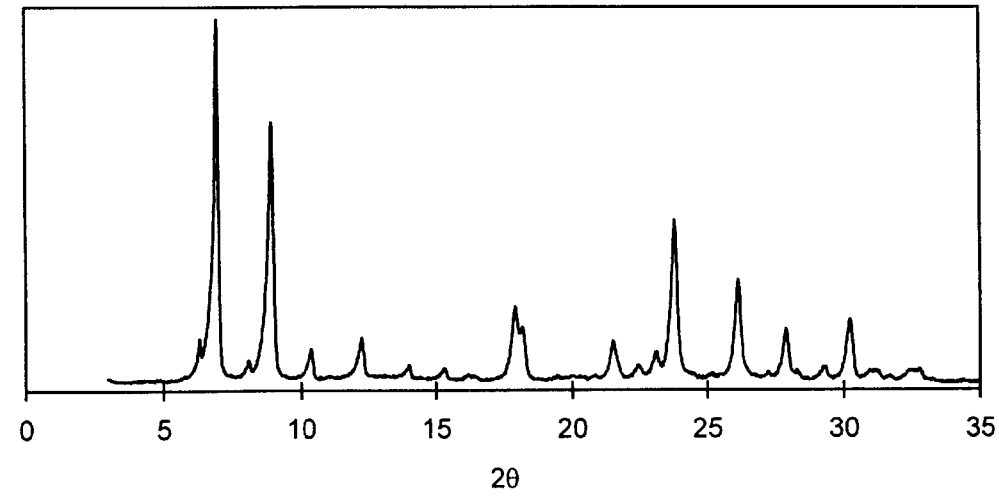
FIG. 3 shows the X-ray diffraction spectrum of the pigment of example 6. The y-axis in all cases shows the intensity in arbitrary units.

The examples which follow illustrate the invention, without limiting its scope in any way.

EXAMPLE 1

A zinc phthalocyanine is obtained by the isoindoline process, using ethylene glycol as the solvent and 160° C. as the reaction temperature. The product has the characteristic peaks of the θ and β crystal phases in the range of Bragg angles (2θ) from 5 to 20, however with stronger signals in the range from 5 to 10. The proportion of θ: β is about 1:3½.

EXAMPLE 2

A 0,75 l kneader is loaded with 45 g of the product of example 1,360 g of pulverized sodium chloride and 113 ml of diacetone alcohol. The kneader is then operated at 80 rpm, with temperature regulation of its walls to 45° C. After 6 hours, the speed is reduced to 5 rpm, the mass cooled to room temperature (~25° C.) and 120 ml of soft water slowly added. The mixture is poured into 3 l of water and the suspension then agitated for 3 hours, filtrated and washed with water until salt-free. The product is dried at 80° C./3·10³ Pa for 15 hours and sifted (mesh size 0.4 mm). It has the characteristic peaks of the θ and β crystal phases over the whole range, however with a much weaker signal at ~9.3, than would be expected from a physical mixture of the distinct phases. The 2 strongest peaks of the θ crystal phase are slightly shifted to about 0.2 lower values, too. The particle size is ≦0.2 μm.

| Analysis [%]: | theor.: | C 66.32 | H 2.81 | N 19.34 | Zn 11.29; |
|---|---|---|---|---|---|
| C₃₂H₁₆N₈Zn · 0.24 H₂O | found: | C 66.14 | H 2.87 | N 19.09 | Zn 10.90. |

EXAMPLE 3

63.0 grams of polyvinylchloride, 3.0 grams epoxidized soy bean oil, 2.0 grams of barium/cadmium heat stabilizer, 32.0 grams dioctyl phthalate and 1.0 gram of the pigment prepared according to Example 2 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2, by constant folding, removal and feeding. The resulting soft PVC sheet is colored in an attractive bluegreen shade and is fast to heat, light and migration.

EXAMPLE 4

0.1 g of the pigment prepared according to Example 2 is mixed with 13.3 g of polyvinyl chloride (Evipol® SH 7020, of EVC GmbH) and 7.3 ml of a stabiliser mixture consisting of 92.21% by weight of DIDP Vestinol® (Hüjls Chemie), 4.19% by weight of Rheoplast® 39 and 3.6% by weight of Irgastab® BZ561 (both Ciba Specialty Chemicals Inc.), and this mixture is then processed to a thin film on a roll mill for 15 minutes at 160° C.

EXAMPLE 5

1.5 g of methyl methacrylate/methacrylic acid (7:3) copolymer are dissolved into 100 ml of isopropanol. 15 g of the product of example 2 are added under high speed stirring. The suspension is dropped into 1 l of n-hexane. The precipitate is filtrated and dried at room temperature under reduced pressure, than dispersed into a solution of 1.425 g sodium dodecyl sulfate in 100 ml of water for 30 minutes with a homogenizer. While stirring under nitrogen, 15 ml of this dispersion, 24.51 g of styrene, 4.6 g of butylacrylate, 1.53 g of methyl methacrylate and 0.7 g of tert.-butyl mercaptane are added to 235 ml of deionized water. The mixture is heated to 70° C., then 1.0137 g of K₂S₂O₇ are added. After further stirring for 7 hours at 70° C. and cooling to room temperature, a fine particle size polymerisation toner is prepared.

EXAMPLE 6

It is proceded as in examples 1, with the difference that nickel acetate is used instead of zinc.

EXAMPLES 7–11

It is proceded as in examples 1 to 5, with the difference that the product of example 6 is used instead the product of example 1. The results are compared with those of examples 1 to 5.

EXAMPLE 12

0.1 kg/hour of cetyl pyridinium chloride, 10 kg/hour of a copolymer from 58 weight % of styrene and 42 weight % of n-butylmethacrylate and 0.6 kg/hour of the pigment of example 2 are continuously fed into the first port of an extruder (ZSK-30) heated at 120° C. After grinding, jetting and classification, a toner of 11 μm average particle size is obtained.

What is claimed is:

1. A process for the preparation of a pigment through kneading of a crude phthalocyanine compound with a water-soluble crystalline inorganic salt in the presence of an organic liquid, then adding water, filtrating and washing to separate said pigment from said salt, then drying said pigment, in which said phthalocyanine compound is a compound or a mixture of compounds of formula

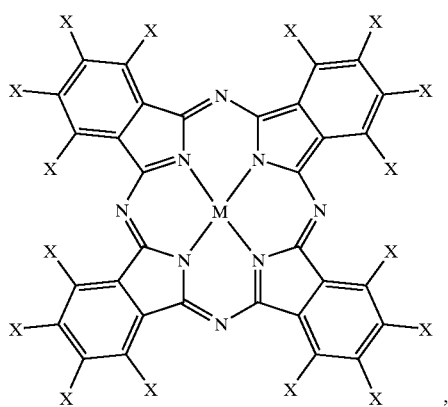

(I)

wherein M is two hydrogens or Zn(II), Fe(II), Ni(II), Ru(II), Rh(II), Pd(II), Pt(II), Mn(II), Be(II), Ca(II), Ba(II), Cd(II), Hg(II), Sn(II), Co(II), Pb(II), V(IV)O, Mn(IV)O, Zr(IV)O, Ti(IV)O, Fe(III)Cl, In(III)Cl, Ce(III)Cl, Al(III)OH, Cr(III)OH, Bi(III)OH or Zr(IV)(OH)$_2$, with the proviso that each X independently from all others is hydrogen or halogen; and said organic liquid is water-soluble and has a pk$_a$ or pk$_b$ of from 5.5 to 8.5 and at least one oxy or oxo group in its molecule.

2. A process according to claim 1, wherein M is two hydrogens or Zn(II), Fe(II), Ni(II), Ru(II), Rh(II), Pd(II), Pt(II), Mn(II), Be(II), Ca(II), Ba(II), Cd(II), Hg(II), Sn(II), Co(II), Pb(II), V(IV)O, Mn(IV)O, Zr(IV)O, Ti(IV)O, Fe(III)Cl, In(III)Cl, Al(III)OH, Cr(III)OH, or Zr(IV)(OH)$_2$.

3. A process according to claim 1, wherein said organic liquid is selected from the group consisting of alcohols, ethers, ketones, esters, amides, sulfoxides, sulfones and mixtures thereof.

4. A process according to claim 1, wherein said crude phthalocyanine is obtained from a reaction in a polyhydric alcohol.

5. A process according to claim 1, wherein M is Zn(II), Be(II), Ca(II), Ba(II), Cd(II), Hg(II), Sn(II), Pb(II), V(IV)O, Mn(IV)O, Zr(IV)O, Ti(IV)O, In(III)Cl, Al(III)OH, Cr(III)OH or Zr(IV)(OH)$_2$.

6. A process according to claim 5, wherein M is Al(III)OH, Ti(IV)O, V(IV)O, Zr(IV)(OH)$_2$, or Zn(II).

7. A process according to claim 1, wherein M is Ni(II).

8. A process according to claim 1, wherein M is Zn(II).

9. A process according to claim 1, wherein pK$_a$ or pK$_b$ is from 6 to 8.

10. A phthalocyanine pigment of formula

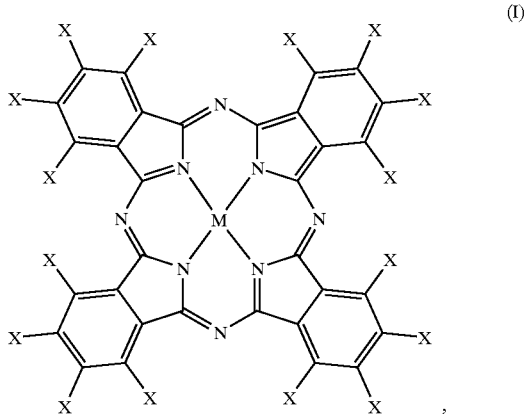

(I), (I), wherein M is two hydrogens or Zn(II), Fe(II), Ni(II), Ru(II), Rh(II), Pd(II), Pt(II), Mn(II), Be(II), Ca(II), Ba(II), Cd(II), Hg(II), Sn(II), Co(II), Pb(II), V(IV)O, Mn(IV)O, Zr(IV)O, Ti(IV)O, Fe(III)Cl, In(III)Cl, Ce(III)Cl, Al(III)OH, Cr(III)OH, Bi(III)OH or Zr(IV)(OH)$_2$, with the proviso that each X independently from all others is hydrogen or halogen, which phthalocyanine pigment comprises a β crystalline phase and optionally an α crystalline phase and has an X-ray diffraction spectrum showing signals in the range of Bragg angles (2θ) from 5 to 30 (Cu K$_\alpha$) wherein a sum of heights for signals corresponding to the β crystalline phase is from 50 to 95% and a sum of heights for signals corresponding to the α crystalline phase is from 0 to 5%, both based on a total sum of heights for all signals.

11. A phthalocyanine pigment according to claim 10, wherein M is Ni(II).

12. A phthalocyanine pigment according to claim 10, wherein M is Zn(II).

13. A phthalocyanine pigment according to claim 10, which also comprises an X-ray diffraction signal corresponding to the θ crystalline phase.

14. A pigmented toner comprising from 30–99% by weight of polymeric resin, 0.5–50% by weight of pigment according to claim 10 and 0.5–20% by weight of charge control agent.

15. A method of preparation of a toner comprising incorporating a pigment according to claim 10 into a polymeric resin.

16. A pigmented toner comprising from 1 to 70 weight % of a pigment according to claim 10, based on the total weight of the pigmented toner, and a polymeric resin.

17. A pigmented toner comprising from 1 to 70 weight % of a pigment according to claim 10 based on total weight of the pigmented toner, and a polymeric resin, wherein M is Ni(II).

18. A pigmented toner comprising from 1 to 70 weight % of a pigment according to claim 10, based on total weight of the pigmented toner, and a polymeric resin, wherein M is Zn(II).

* * * * *